United States Patent [19]

Clayton et al.

[11] 3,741,452

[45] June 26, 1973

[54] MODIFIED STEEL RULE DIE

[75] Inventors: William J. Clayton, Fairport; Clair C. Smith, Holcombe; Earl K. Dewey, Canadaigua, all of N.Y.

[73] Assignee: Mobil Oil Corporation, New York, N.Y.

[22] Filed: Mar. 29, 1971

[21] Appl. No.: 129,232

Related U.S. Application Data

[62] Division of Ser. No. 849,721, Aug. 13, 1969, abandoned.

[52] U.S. Cl. .................................. 225/103, 83/695
[51] Int. Cl. ............................................. B26f 3/02
[58] Field of Search .................... 264/163; 83/652, 83/695, 678; 225/103, 104

[56] References Cited
UNITED STATES PATENTS
3,520,220  7/1970  Acker .............................. 83/695 X Primary Examiner—Andrew R. Juhasz
Assistant Examiner—Leon Gilden
Attorney—Oswald G. Hayes, Hastings S. Trigg et al.

[57] ABSTRACT

The formation of plastic bodies from thermoplastic sheet using the hot platen technique and trimming in place in the mold, wherein the molded product is removed from the forming press while still attached to the sheet. A sheet having the molded product attached thereto but much more easily removed is formed by using a modified steel rule die. The die is modified by cutting small slots at a plurality of points in the outside edge of the blade so that at the point of slotting, the cutting edge of the die is narrower than the rest. When the die is pressed into the sheet following the molding step, a long crack forms around the periphery of the product until the point of a slot is reached and a small crack forms along the length of the slot leaving an attachment to the sheet between the long and the small cracks.

1 Claim, 3 Drawing Figures

PATENTED JUN 26 1973 3,741,452

MODIFIED STEEL RULE DIE

This application is a division of Ser. No. 849,721, filed Aug. 13, 1969, now abandoned.

BACKGROUND OF THE INVENTION

1. Field of the Invention

This invention is directed to the formation of plastic shapes from thermoplastic sheet by the hot platen technique. It is more particularly concerned with a modified steel rule die for use in the process.

2. Description of the Prior Art

As is well known to those familiar with the art, in the hot platen process of thermoforming from thermoplastic sheet, the sheet is held against a hot platen by a pressure differential and then forced into the mold cavity by a reverse pressure differential. As is described in U.S. Pat. No. 3,190,946, a steel rule die (therein called a dull knife 84), around the mold periphery first holds the sheet during molding and then is forced into the sheet to form a crease but does not sever the sheet. The sheet with molded product still attached by a thin layer of plastic is moved in a nonlinear path so that the product breaks out of the sheet. The degree of attachment between the molded product and the sheet, however, is highly variable, attributable in part to variations in the thickness of the sheet. If the attachment is not sufficiently secure, and only a single molded product is jolted out of the sheet prematurely the operation must be stopped and an adjustment must be made before production can continue. Also, if the attachment of a single molded product is too secure and the product does not break out when it is supposed to, again production must be stopped for adjustment. It has also been proposed in the aforedescribed procedure, instead of creasing the sheet, to penetrate the sheet with the steel rule die to an extent that the sheet is cracked (not cut) through. In order to retain attachment of product to the sheet, notches are cut in the cutting edge of the die so that the crack is interrupted at intervals about the periphery and the solid attachments are retained. When the product is separated from the sheet, however, there remain sharp projections on the product that can cut fingers and tent to cut the film overwrap, necessitating repackaging.

SUMMARY OF THE INVENTION

This invention provides, in the process of forming plastic bodies from thermoplastic sheet using the hot platen technique and trimming in place in the mold with a steel rule die around the periphery of the mold cavity whereby the molded product is removed from the mold still partially attached to the sheet, the improvement of obtaining a sheet having molded product attached thereto but easily removable without developing sharp edges, that comprises using a steel rule die beveled on one edge to form a narrow, dull cutting edge and having a plurality of small slots at intervals along the beveled edge to form a narrower dull cutting edge at the slots.

DESCRIPTION OF THE SPECIFIC EMBODIMENTS

This invention provides a modified steel rule die or dull knife for use in the hot platen process such as described in U.S. Pat. No. 3,190,946, to which reference is made. In that process, however, the sheet is creased by the knife and is not cut through. In using the modified steel rule die, it is forced into the sheet a distance to crack it through the sheet where the die contacts the sheet. With the modified steel rule die most of the periphery of the molded product is severed from the sheet, but there are points of positive attachment, as is hereinafter described.

Figure 1:
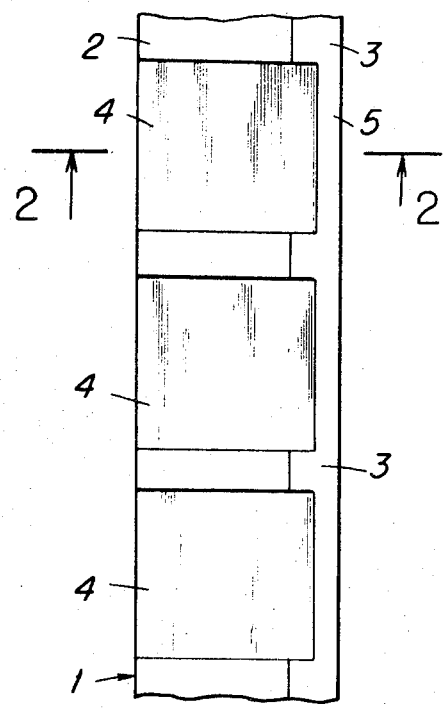
FIG. 1 is a view of a section of a modified steel rule die of this invention showing the dull cutting edge and a slotted portion therein.
Figure 2:
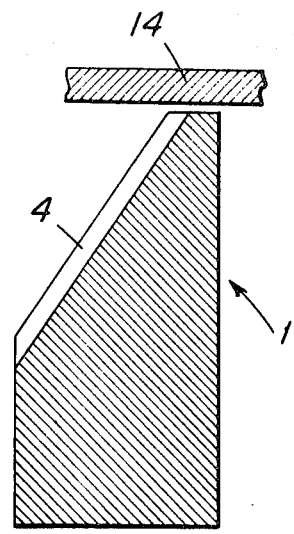
FIG. 2 is a sectional elevation view of the steel rule die taken at 2—2 in FIG. 1.

Referring now to FIGS. 1 and 2, there is shown a section of a standard steel rule die 1 that has been sharpened by beveling along one edge 2 to form a dull flat cutting edge 3. The width of the cutting edge 3 can be between 2 mils and 8 mils wide, but preferably between 4 mils and 6 mils.

Then, at a plurality of points along the steel rule die, slots 4 are cut into the beveled edge 2 to form a narrower cutting edge 5. A depth of as little as 2 mils on the surface of the cutting edge works reasonable well. A slot depth of 5 mils out of a total distance of 6 mils is the most satisfactory. From a practical standpoint, however, a depth of about half that of the original edge is the most convenient.

The width or length of the slot can be from about 1/16 inch to any length desired. A length less than 1/16 inch would be likely not to be completely reproducible and a very long slot would be mechanically awkward. In preferred practice a length of one-eighth–one-fourth inch is used.

Figure 3:
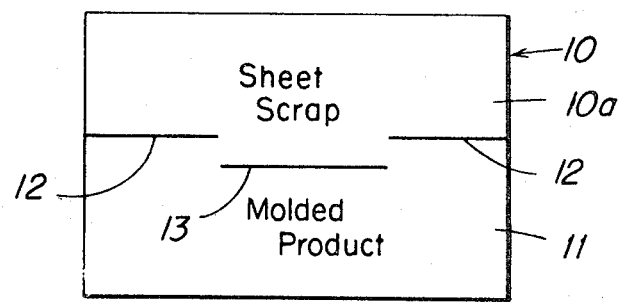
FIG. 3 is a view of a section of sheet scrap and molded product showing a portion of the cuts resulting from the modified steel rule die of this invention.

FIG. 3 shows a portion of a sheet 10 after the molding and cracking (cutting) have been effected. Section 10a is the smooth scrap portion and 11 is a section of molded product. As the steel rule die is compressed into the sheet against the platen 14, cracking occurs when sufficient compression is attained. The crack that forms is very smooth and straight and it forms along about the center line of the cutting edge. Thus, when the modified steel rule die of this invention is used to crack through the sheet, a crack 12 forms along the center line of the wider cutting edge 3 until a slot is reached. At that point, another crack 13 forms along the center line of the narrower cutting edge 5. The attachment remaining between the molded product and the sheet scrap is the distance (1–2 mils) between the two offset crack lines. This gives a secure attachment which, by the nature of the way it is located, breaks off easily. The resultant molded product, after being broken free, will have a smooth edge with small nicks where the slot portion has been positioned. These nicks and the breakoff points contribute so little to the roughness of the edge that it is very difficult to find, unless a person knows where to look. Further, there are no sharp protrusions that can cut fingers and overwrap.

The modified steel rule die of this invention can be used in any method of forming plastic articles from thermoplastic sheets using deep drawing-die-forming techniques. Thus, there can be formed containers, such as meat and produce trays; toys; novelties; and similar articles.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A modified steel rule die adapted for use with a platen beveled on one edge to form a narrow, planar dull cutting edge parallel to the plane of said platen and having a plurality of small slots at intervals along the beveled edge intersecting the plane of said cutting edge to form a narrower dull cutting edge at the slots.

* * * * *